US012639924B2

(12) United States Patent
Cao et al.

(10) Patent No.: US 12,639,924 B2
(45) Date of Patent: May 26, 2026

(54) THREE-STAGE MODULARIZED CONVOLUTIONAL NEURAL NETWORK FOR RAPIDLY CLASSIFYING CONCRETE CRACKS

(71) Applicants: Hohai University, Nanjing City (CN); Jiangxi University of Science and Technology, Ganzhou City (CN)

(72) Inventors: Maosen Cao, Nanjing City (CN); Ronghua Fu, Nanjing City (CN); Yufeng Zhang, Nanjing City (CN); Tongfa Deng, Ganzhou City (CN); Shuai Li, Nanjing City (CN); Dragoslav Sumarac, Nanjing City (CN)

( * ) Notice: Subject to any disclaimer, the term of this patent is extended or adjusted under 35 U.S.C. 154(b) by 304 days.

(21) Appl. No.: 18/398,205

(22) Filed: Dec. 28, 2023

(65) Prior Publication Data

US 2024/0221357 A1      Jul. 4, 2024

(30) Foreign Application Priority Data

Dec. 29, 2022      (CN) .......................... 202211705494.4

(51) Int. Cl.
 *G06V 10/77* (2022.01)
 *G06T 7/00* (2017.01)
   (Continued)
(52) U.S. Cl.
 CPC .......... *G06V 10/764* (2022.01); *G06T 7/0002* (2013.01); *G06V 10/7715* (2022.01);
   (Continued)

(58) Field of Classification Search
 CPC ............ G06V 10/764; G06V 10/7715; G06V 10/774; G06V 10/82; G06T 7/0002;
   (Continued)

(56) References Cited

U.S. PATENT DOCUMENTS

2022/0024485 A1*  1/2022  Theverapperuma ........................ G01C 21/3635

FOREIGN PATENT DOCUMENTS

CN          111681240 A  *  9/2020  ............. G06N 3/045

OTHER PUBLICATIONS

Fu et al, Enhanced Intelligent Identification of Concrete Cracks Using Multi-Layered Image Preprocessing-Aided Convolutional Neural Networks, 2020, Sensors (20): pp. 1-24. (Year: 2020).*

(Continued)

*Primary Examiner* — Kathleen M Broughton
(74) *Attorney, Agent, or Firm* — Nitin Kaushik

(57) ABSTRACT

Disclosed is a three-stage modular convolutional neural network (CNN), referred to as Stairnet, for efficient classification of concrete cracks in images. Unlike conventional CNNs that employ repetitive layer structures, Stairnet is organized into three distinct stages—Stair1, Stair2, and Stair3—each with unique architectural characteristics. Stair1 is composed solely of convolution layers; Stair2 introduces a higher layer count and incorporates channel-split and shuffle operations; and Stair3 utilizes larger expansion factors and kernel sizes along with attention mechanisms. Variations in Stair1 and Stair2 enable structural adaptability based on model hyperparameters. Compared to general-purpose CNNs designed for thousands of classes, Stairnet achieves a compact model size, faster training, and high accuracy in concrete crack classification.

8 Claims, 6 Drawing Sheets

(51) Int. Cl.
    *G06V 10/764*       (2022.01)
    *G06V 10/774*       (2022.01)
    *G06V 10/82*        (2022.01)

(52) U.S. Cl.
    CPC ............ *G06V 10/774* (2022.01); *G06V 10/82*
        (2022.01); *G06T 2207/20081* (2013.01); *G06T*
               *2207/20084* (2013.01)

(58) Field of Classification Search
    CPC ......... G06T 7/0004; G06T 2207/20081; G06T
            2207/20084; G06T 2207/30132; G06N
                         3/045
    See application file for complete search history.

(56)              References Cited

OTHER PUBLICATIONS

Li et al, Automatic Tunnel Crack Detection Based on U-Net and a Convolutional Neural Network with Alternately Updated Clique, 2020, Sensors (20): pp. 1-23. (Year: 2020).*
Lumbanraja et al, Classification of cracked concrete images using convolutional neural algorithm, 2022, AIP Conference pp. 1-8. (Year: 2022).*
Jing et al, Road Crack Detection Using Deep Neural Network Based on Attention Mechanism and Residual Structure, 2022, Digital Object Identifier (11): 919-929 (Year: 2022).*

\* cited by examiner

Basic Block_1 of Feature Extraction Layer1(Stair1)

(a)

Basic Block_2 of Feature Extraction Layer2(Stair2)

(b)

Basic Block_3 of Feature Extraction Layer3(Stair3)

(c)

3 channel Input — Filters*4 — Maps*4

Conv

Input Channel = Filter Channel=M
Output Channel = Number of Filter=N (a)

3 channel Input — Fliters*3 — Maps*3

DConv

Filter Channel = 1
Input Channel Number of Filter = Number of Output = M (b)

THREE-STAGE MODULARIZED CONVOLUTIONAL NEURAL NETWORK FOR RAPIDLY CLASSIFYING CONCRETE CRACKS

TECHNICAL FIELD

The present disclosure pertains to the field of concrete crack pattern classification. More specifically, it relates to a three-stage modular convolutional neural network (CNN) for rapid classification of concrete cracks in images. The proposed network may also serve as a feature extraction backbone within object detection algorithms.

BACKGROUND ART

Concrete structures are inevitably susceptible to damage from both anthropogenic and environmental factors, with cracking being one of the most common forms of such damage. Consequently, there exists a need for efficient and accurate crack classification systems. Advances in unmanned aerial vehicles (UAVs), crawling robots, and wireless transmission technology have facilitated the collection of large-scale data on concrete structures, thereby creating opportunities for developing intelligent classification systems for visible cracks in concrete.

Compared to traditional manual inspection, deep learning-based crack classification offers advantages including higher accuracy and faster detection speeds. However, conventional deep neural networks—originally developed for computer vision tasks involving thousands of object classes—are generally characterized by large model sizes and numerous convolutional layers with repetitive structures. As a result, they are not well-suited for the rapid classification of concrete cracks.

SUMMARY

The present disclosure proposes a three-stage modularized CNN for rapidly classifying concrete cracks in images, comprising the following steps.

A concrete crack dataset for training the CNN.

The structure of the three-stage modularized CNN, designated as Stairnet, includes, in sequence: an input layer; a first stage comprising shallow-layer blocks denoted as Stair1; a convolutional block attention module (CBAM); a second stage comprising mid-layer blocks denoted as Stair2; another CBAM; a third stage comprising deep-layer blocks denoted as Stair3; and a fully connected layer.

After training, the Stairnet model classifies concrete cracks by receiving crack images as input.

The shallow-layer stage (Stair1) is constructed using inverted residual blocks composed solely of convolutions (Convs).

The mid-layer stage (Stair2) is configured as follows: When the stride is set to 1, the Stair2 structure involves: performing a split operation on input feature maps of Stair2. One part of the input feature maps passes through an inverted residual structure that includes a depthwise separable convolution (DConvs), while the other part does not undergo any operation. Afterward, the two part of the input feature maps are concatenated by a shuffle operation. When the stride is set to 2, the Stair2 structure involves copying the input feature maps. One part of the input feature maps is reduced in dimension through an inverted residual structure with a depthwise separable convolution, another part is reduced in dimension through another depthwise separable convolution, and the third part is reduced in dimension through a maximum pooling. Finally, the three part of the input feature maps are concatenated, followed by another channel shuffle operation.

The deep-layer stage (stair3) comprises inverted residual structures that incorporate DConvs and efficient channel attention (ECA) modules.

Preferably, the expansion factor of Stair1 is 1 or not.

Preferably, the input layer includes a convolution layer, a batch normalization (BN) layer, and an activation function (AF) layer.

Preferably, the normalization processing of the BN layer is shown in the following formulas:

$$\mu_{\mathcal{B}} = \frac{1}{m} \sum_{i=1}^{m} x_i$$

$$\sigma_{\mathcal{B}}^2 = \frac{1}{m} \sum_{i=1}^{m} (x_i - \mu_{\mathcal{B}})^2$$

$$\hat{x}_i = \frac{x_i - \mu_{\mathcal{B}}}{\sqrt{\sigma_{\mathcal{B}}^2 + \epsilon}}$$

$$y_i \leftarrow \gamma \hat{x}_i + \beta,$$

where $x_i$ is a feature map before inputting to the BN layer; $y_i$ is a feature map after outputting from the BN layer; m is the number of feature maps input to the layer in the current training batch; and $\gamma$ and $\beta$ are variables that vary with network gradient renewal.

Preferably, the AF layer performs non-linear processing via ReLU6:

$$f(x_i) = \min(\max(x_i, 0), 6),$$

where $x_i$ is a feature map before inputting the ReLU6, and $f(x_i)$ is a feature map after outputting the ReLU6.

Preferably, another AF layer performs non-linear processing via data of a Hardswish:

$$\text{Hardswish}(x) = \begin{cases} 0 & \text{if } x \le -3 \\ x & \text{if } x \ge +3 \\ x \cdot (x+3)/6 & \text{otherwise} \end{cases},$$

where x is a feature map before inputting the Hardswish, and f(x) is a feature map after outputting the Hardswish.

Preferably, the ECA attention mechanism performs cross-channel interaction on data to obtain an enhanced concrete crack feature extraction map;

$$k = \psi(C) = \left| \frac{\log_2(C)}{\gamma} + \frac{b}{\gamma} \right|_{odd}$$

$$E_s(F) = \sigma\left(f^{k*k}[AvgPool(F)]\right),$$

where $|t|_{odd}$ represents the nearest odd t; C represents the number of channels inputting data into the ECA attention mechanism, and $\gamma$ and b are two hyper-parameters; $\gamma$ is set to 2 and b is set to 1; $E_s(F)$ is the ECA attention mechanism, $\sigma$ is a sigmoid operation, $f^{k*k}[\cdot]$ represents performing a k*k convolution operation, F is the input feature map, and AvgPool( ) is the average pooling operation.

Preferably, in the CBAM attention mechanism, the average pooling and maximum pooling are used to aggregate spatial information of the feature map, compress spatial dimensions of the input feature map, and sum and merge element by element to generate a channel attention map:

$$M_c(F) = \sigma(MLP(AvgPool(F)) + MLP(MaxPool(F))),$$

where $M_c$ represents the channel attention, and MLP ( ) is composed of fully connected layer 1+ReLU6+fully connected layer 2; $\sigma$ is the sigmoid operation, F is the input feature map, AvgPool( ) is the average pooling, MaxPool( ) is the maximum pooling, $M_s$ represents the spatial attention mechanism, $\sigma$ is the sigmoid operation; and the average pooling and the maximum pooling methods are used to compress the input feature map in a spatial attention module, to obtain a feature extraction map containing more crack information:

$$M_s(F) = \sigma\left(f^{7*7}[AvgPool(F), MaxPool(F)]\right),$$

where $M_s$ represents the spatial attention mechanism, a is the sigmoid operation, $f^{7*7}$ [·] represents performing a 7*7 convolution operation, F is the input feature map, AvgPool( ) is the average pooling, and MaxPool( ) is the maximum pooling.

Preferably, there further includes:

sparsifying data passing through a dropout layer in each layer to avoid network over-fitting:

$$r_j^{(l)} \sim \text{Bernoulli}\ (p)$$

$$\tilde{y}^{(l)} = r^{(l)} * y^{(l)},$$

where the Bernoulli(p) function is used to generate a probability $$r_j^{(l)}$$

vector, to enable a neuron to stop working with the probability p; $y^{(l)}$ is an output feature map of the previous layer; $\tilde{y}^{(l)}$ is a feature map output after passing through the dropout layer.

Preferably, there further includes:

optimizing network internal parameters using the following Adam algorithm:

$$f(\theta) = \text{Loss}(y_{o,c}, p_{o,c})$$

$$g_t = \nabla_\theta f_t(\theta_{t-1})$$

$$m_t = \beta_1 \cdot m_{t-1} + (1 - \beta_1) \cdot g_t$$

$$v_t = \beta_2 \cdot v_{t-1} + (1 - \beta_2) \cdot g_t^2$$

-continued $$\hat{m}_t = m_t/(1 - \beta_1^t)$$

$$\hat{v}_t = v_t/(1 - \beta_2^t)$$

$$\theta_t = \theta_{t-1} - \alpha \cdot \hat{m}_t / \left(\sqrt{\hat{v}_t} + \epsilon\right),$$

where $\text{Loss}(y_{o,\ c},\ p_{o,\ c})$ is a loss function between a predicted value and a true value of the network; $\theta$ is a parameter to be updated in the model; $g_t$ is a gradient obtained by deriving $\theta$ from the loss function $f(\theta)$; $\beta_1$ is a first-moment attenuation coefficient; $\beta_2$ is a second-moment attenuation coefficient; $m_t$ is an expectation of the gradient $g_t$; $v_t$ is an expectation of $$g_t^2,$$

$\hat{m}_t$ is an offset correction of m; $\hat{v}_t$ is an offset correction of $v_t$; $\theta_{t-1}$ is a parameter before the network update; $\theta_t$ is a parameter after the network update; and $\alpha$ is a learning rate.

The advantageous effects of the present disclosure are as follows:

The present disclosure provides a three-stage modular convolutional neural network (CNN) designed for rapid classification of concrete cracks in images. Conventional CNN architectures such as AlexNet, VGG16, ResNet50, GoogLeNet, and MobileNetV3-Large typically employ repeated, homogeneous layer structures across their networks. While effective for general-purpose vision tasks, these models are often computationally heavy and suboptimal for efficient concrete crack classification. In contrast, the proposed model, termed Stairnet, introduces distinct feature-learning mechanisms across its shallow, middle, and deep stages. This three-stage modular design enables Stairnet to achieve a compact architecture, reduced training time, and superior classification accuracy specifically for concrete cracks.

BRIEF DESCRIPTION OF THE DRAWINGS

FIG. 3 (*b*) is an operation diagram of blocks in stair2 according to an embodiment of the present disclosure;

FIG. 3 (*c*) is an operation diagram of blocks in stair3 according to an embodiment of the present disclosure;

FIG. 5 (*b*) is an illustration of DConvs according to an embodiment of the present disclosure;

FIG. 6 (*b*) is the training loss of Stairnet and the other compared models during training according to an embodiment of the present disclosure;

FIG. 6 (*c*) is the validation accuracy of Stairnet and the other compared models during training according to an embodiment of the present disclosure;

FIG. 6 (*d*) is the validation loss of Stairnet and the other compared models during training according to an embodiment of the present disclosure.

DETAILED DESCRIPTION OF THE EMBODIMENTS

The present disclosure is described in detail in combination with the drawings and embodiments. The specific embodiments described herein are intended only to explain the present disclosure and are not intended to limit it.

Embodiment 1

The three-stage modularized CNN in the present disclosure is implemented using PyTorch and further details can be found in Table 1:

TABLE 1

| Computer platform and environment configuration used in the embodiment | |
| --- | --- |
| Hardware and software platform | Model parameter |
| Operating system | Windows 10 |
| CPU | Intel(R) Xeon(R) Gold 5222 CPU @ 3.80 GHz 3.79 GHz |
| GPU | NVIDIA Quadro P2200 |
| Memory | 64.0 GB |
| Programming environment | Anaconda3 CUDA10.2 Python3.6 pytorch |

Figure 1:
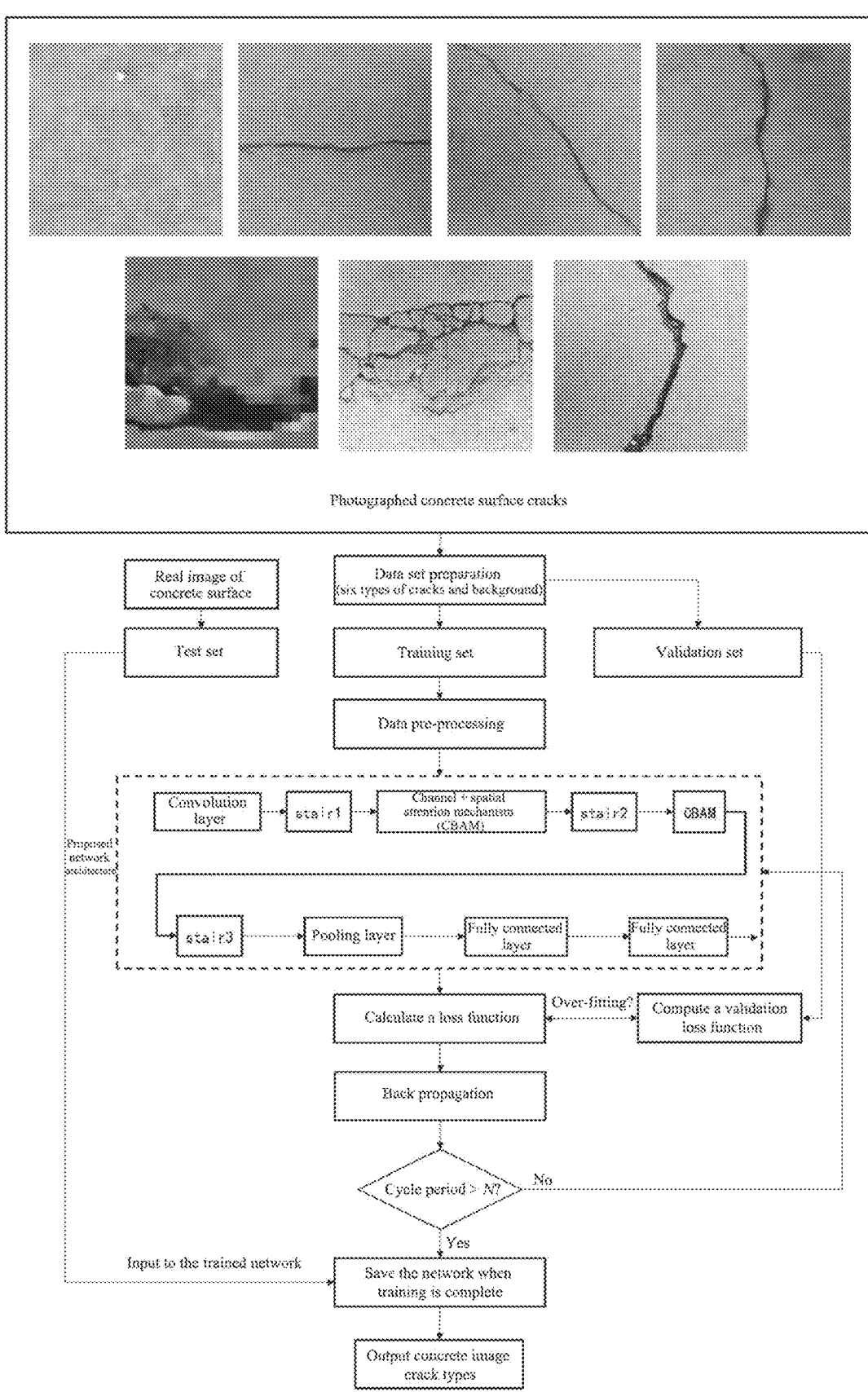
FIG. 1 is a flowchart for concrete cracks classification using Stairnet according to an embodiment of the present disclosure.

FIG. 1 depicts the concrete cracks classification using the three-stage modularized CNN in the present disclosure, including the following steps:

Step 1, a concrete crack dataset is built for training the CNN:

Step 2, stair1 is utilized as the shallow layers of the network;

Step 3, stair2 is utilized as the mid-layers of the network;

Step 4, stair3 is utilized as the deep layers of the network;

Step 5, based on the three stairs1-3, combining deep learning algorithms for example attention mechanisms, forming the Stairnet, and the dataset is used for training the Stairnet until the model converges Step 6, multiple concrete crack images can be fed into the well-trained stairNet to obtain the crack classes in the images.

Figure 2:
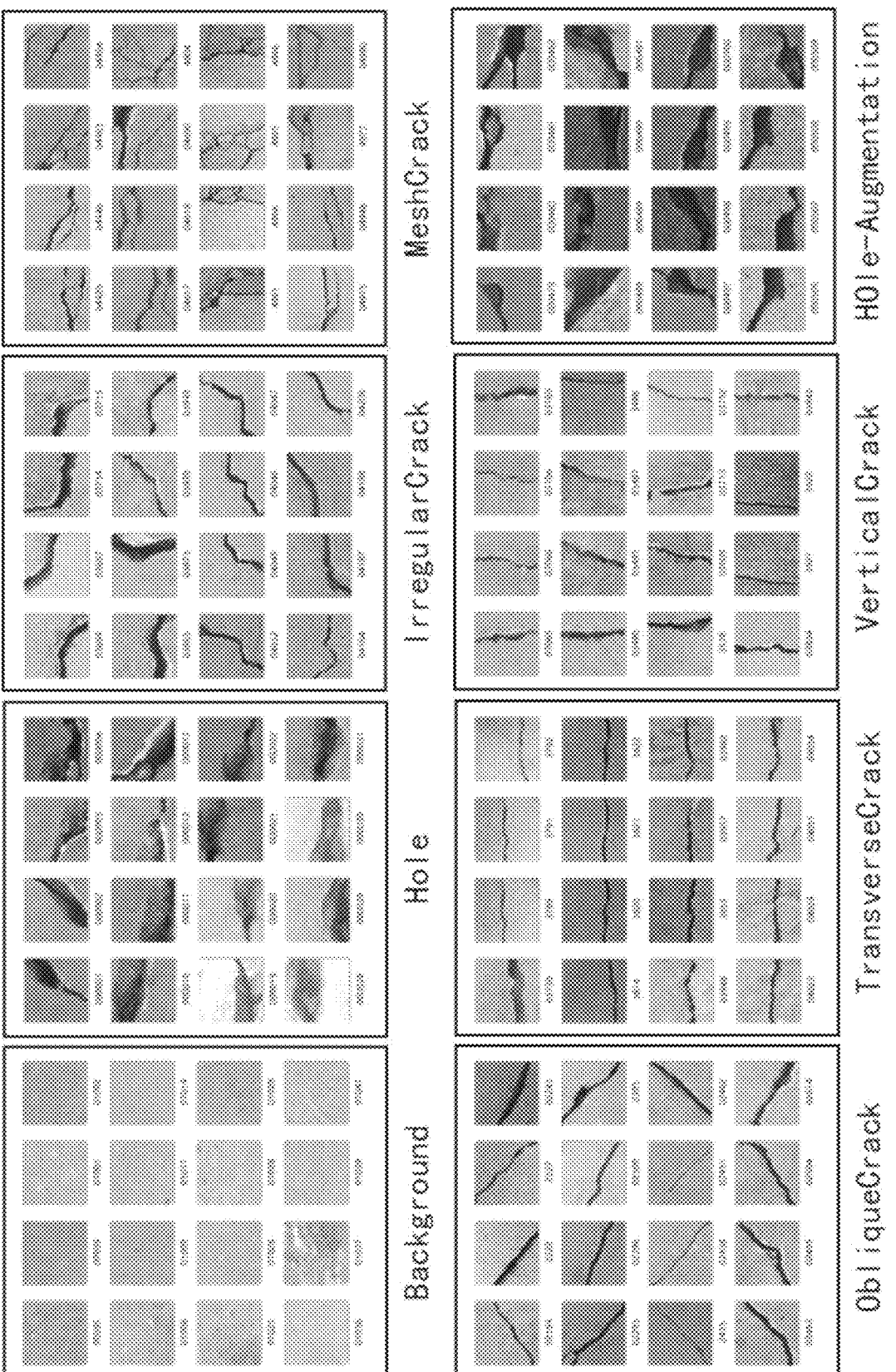
FIG. 2 is an illustration of the concrete crack images in the dataset according to an embodiment of the present disclosure.

Aiming to build the dataset in step 1, the concrete crack images are manually classified. The crack classes include transverse crack, vertical crack, oblique crack, mesh crack, irregular crack, hole, and no crack (background), as shown in FIG. 2; hole-data augmentation is based on digital image processing techniques, for example, adding random pixels, changing color temperature, perspective transformation, horizontal inversion, random pixel zeroing, motion blur, gaussian noise and unequal scaling, are used for data augmentation. They are randomly mixed to address the data-imbalanced problem. The dataset, consisting of ten thousand images, comprises a training set and a validation set. Images are classified into seven classes. The training set contains 7 parts out of 10, while the remaining 3 parts form the validation set.

Figure 3:
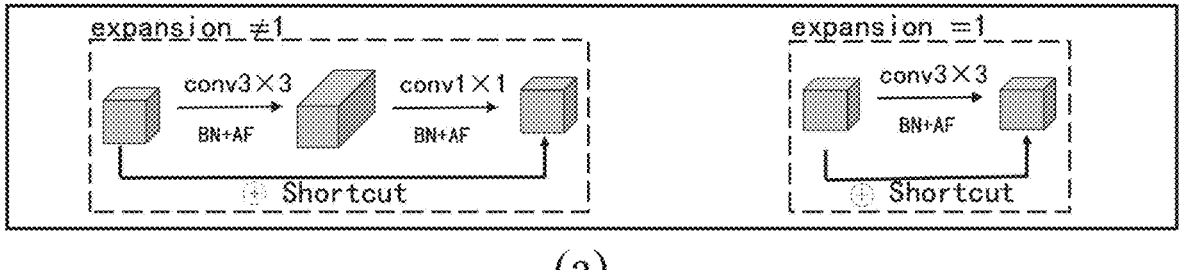
FIG. 3 (*a*) is an operation diagram of blocks in stair1 according to an embodiment of the present disclosure.
Figure 3:
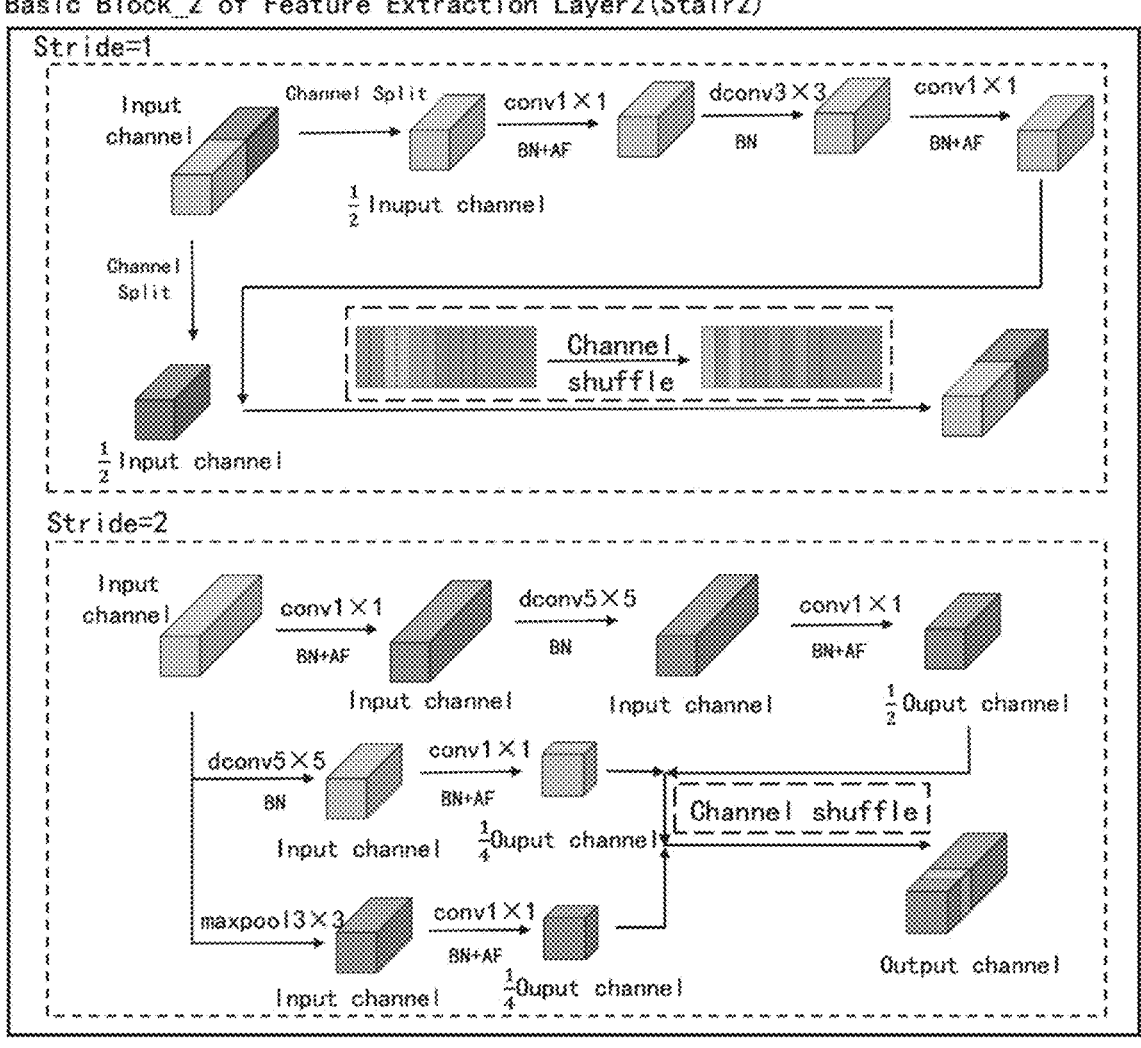
Figure 5:
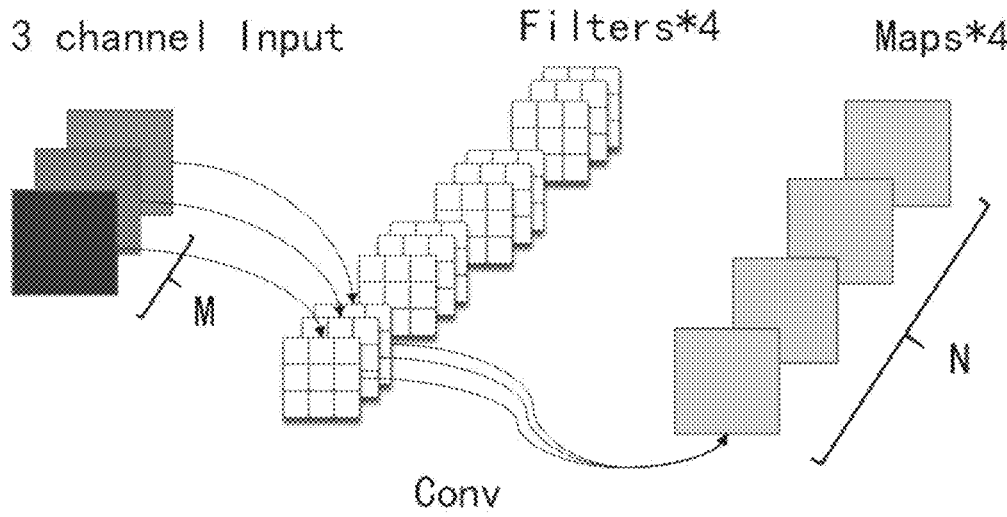
FIG. 5 (*a*) is an illustration of convs according to an embodiment of the present disclosure.
Figure 5:
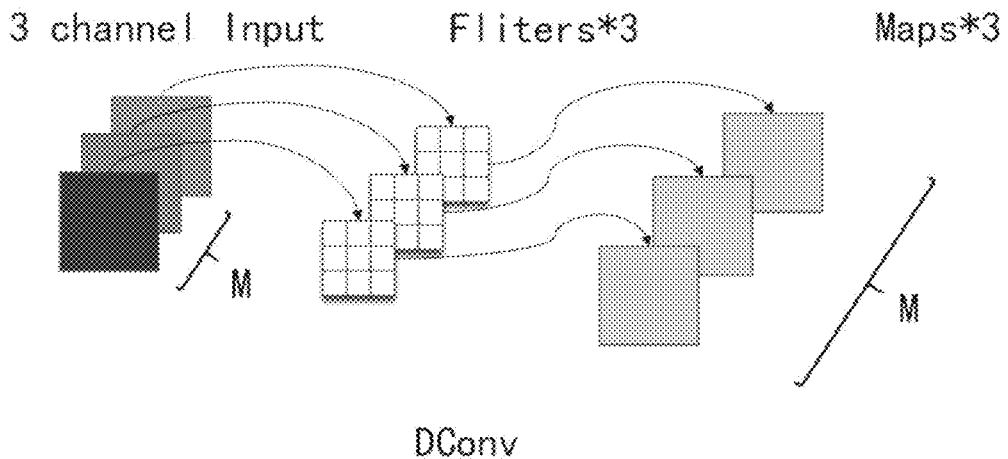

In Step 2, stair1 is composed of inverted residual structures that exclusively utilize convolutions. There are two variations in stair1, depending on whether the expansion factor is 1 or not. The structure of stair1 is depicted in FIG. 3 (*a*), and the convolution operation (Conv) is illustrated in FIG. 5 (*a*). The structural characteristic in stair1 is that stair1 exclusively consists of Convs.

In Step 3, the structure of stair2 in step 3 is shown in FIG. 3 (*b*). The structural characteristic in stair2 is that stair2 has more layers, compared with stair1 and stair3. The structural blocks in stair2 consist of two variations.

When the stride is set to 1, the stair2 structure involves performing a split operation on the input channel. One part of the channel passes through an inverted residual structure that includes a depthwise separable convolution (DConvs), while the other part does not undergo any operation. Afterward, a shuffle operation is performed on the two channels that are concatenated. The structure of the depthwise separable convolution is shown in FIG. 5 (*b*).

When the stride is set to 2, the stair2 involves copying the input channel. One part of the channel is reduced in dimension through an inverted residual structure with a depthwise separable convolution, another part is reduced in dimension through the depthwise separable convolution, and the third part is reduced in dimension through maximum pooling. Finally, a shuffle operation is performed on the three channels that are reduced in dimension after performing a concatenate operation.

In step 4, the structure of stair3 is as shown in FIG. 3 (*c*), including inverted residual structures containing depthwise separable convolutions and efficient channel attention (ECA) modules. As shown in table 2, the expansion factors in stair3 are bigger than those in stair1 and stair2. As shown in FIG. 3 (*c*), the kernel size for feature extraction in stair3 is bigger than that in stair1 and stair2. Therefore, the structural characteristic in stair3 is that stair3 has bigger expansion factors and kernel size, compared with stair1 and stair2

Figures 3, 4:
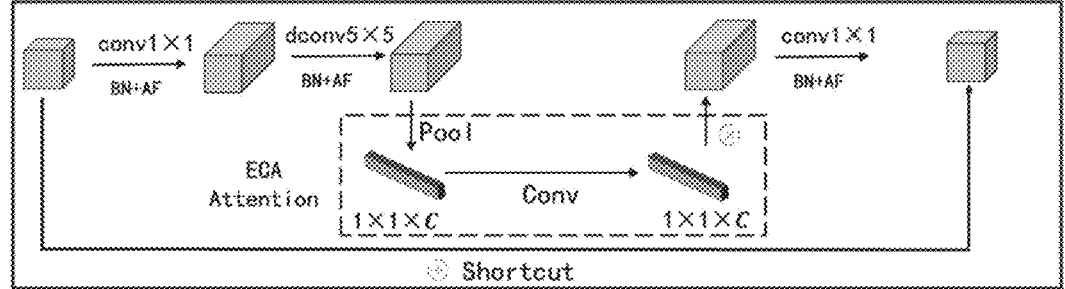
FIG. 4 is an illustration of Stairnet according to an embodiment of the present disclosure.

In step 5, the structure of the Stairnet is shown in FIG. 4. The parameters in each layer of Stairnet are shown in FIG. 2. Stairnet consists of an input layer, blocks of stair1 in shallow layers, a convolutional block attention module (CBAM), blocks of stair2 in mid-layers, another CBAM, blocks of stair3 in deep layers, and a fully connected layer. The activation functions (Afs) in Table 2 include HS (Hardswish) and RE (ReLU6).

TABLE 2

| | Feature extraction layer | Input(Height, Width, channel) | Operator | Expansion factor | Output channel | AF | Stride |
| --- | --- | --- | --- | --- | --- | --- | --- |
| | | Parameters in Stairnet | | | | | |
| Shallow layer | Stair1 | 224 × 224 × 3 | conv2d | \ | 16 | HS | 2 |
| | | 112 × 112 × 16 | Basic block_1 | 2 | 24 | RE | 2 |

TABLE 2-continued

|  |  | | Parameters in Stairnet | | | | |
|---|---|---|---|---|---|---|---|
| Feature extraction layer | | Input(Height, Width, channel) | Operator | Expansion factor | Output channel | AF | Stride |
|  |  | $56 \times 56 \times 24$ | Basic block_1 Channel Attention Spatial Attention | 1 | 24 | RE | 1 |
| Mid-layer | Stair2 | $56 \times 56 \times 24$ | Basic block_2 | \ | 48 | RE | 2 |
|  |  | $28 \times 28 \times 48$ | Basic block_2 | 1 | 48 | HS | 1 |
|  |  | $28 \times 28 \times 48$ | Basic block_2 | \ | 96 | HS | 2 |
|  |  | $14 \times 14 \times 96$ | Basic block_2 Channel Attention Spatial Attention | 1 | 96 | HS | 1 |
| Deep layer | Stair3 | $14 \times 14 \times 96$ | Basic block_3 | 6 | 96 | HS | 2 |
|  |  | $7 \times 7 \times 96$ | Basic block_3 | 6 | 96 | HS | 1 |
|  |  | $7 \times 7 \times 96$ | pool, $7 \times 7$ | \ | \ | \ | 1 |
|  | Classifier | $1 \times 1 \times 512$ | conv2d, $1 \times 1$, NBN, dropout | \ | 512 | HS | 1 |
|  |  | $1 \times 1 \times 512$ | conv2d, $1 \times 1$, NBN | \ | k | \ | 1 |

The normalization processing of the BN layer is shown in the following formulas:

$$\mu_{\mathcal{B}} = \frac{1}{m} \sum_{i=1}^{m} x_i$$

$$\sigma_{\mathcal{B}}^2 = \frac{1}{m} \sum_{i=1}^{m} (x_i - \mu_{\mathcal{B}})^2$$

$$\hat{x}_i = \frac{x_i - \mu_{\mathcal{B}}}{\sqrt{\sigma_{\mathcal{B}}^2 + \epsilon}}$$

$$y_i \leftarrow \gamma \hat{x}_i + \beta,$$

where $x_i$ is a feature map before inputting to the BN layer; $y_i$ is a feature map after outputting from the BN layer; m is the number of feature maps input to the layer in the current training batch; and $\gamma$ and $\beta$ are variables that vary with network gradient renewal.

The AF layer performs non-linear processing via data of a ReLU6:

$$f(x_i) = \min(\max(x_i, 0), 6),$$

where $x_i$ is a feature map before inputting the ReLU6, and $f(x_i)$ is a feature map after outputting the ReLU6.

The AF layer performs non-linear processing via data of a Hardswish:

$$\text{Hardswish}(x) = \begin{cases} 0 & \text{if } x \le -3 \\ x & \text{if } x \ge +3, \\ x \cdot (x + 3)/6 & \text{otherwise} \end{cases}$$

where x is a feature map before inputting the Hardswish, and f(x) is a feature map after outputting the Hardswish.

Specifically, the ECA attention mechanism performs cross-channel interaction on data to obtain an enhanced concrete crack feature extraction map;

$$k = \psi(C) = \left| \frac{\log_2(C)}{\gamma} + \frac{b}{\gamma} \right|_{odd}$$

$$E_s(F) = \sigma\left(f^{k*k}[AvgPool(F)]\right),$$

where $|t|_{odd}$ represents the nearest odd t; C represents the number of channels inputting data into the ECA attention mechanism, and $\gamma$ and b are two hyper-parameters; $\gamma$ is set to 2 and b is set to 1; $E_s(F)$ is the ECA attention mechanism, $\sigma$ is a sigmoid operation, $f^{k*k}[\cdot]$ represents performing a k*k convolution operation, F is the input feature map, and AvgPool( ) is the average pooling operation.

In the CBAM attention mechanism, the average pooling and maximum pooling are used to aggregate spatial information of the feature map, compress spatial dimensions of the input feature map, and sum and merge element by element to generate a channel attention map:

$$M_c(F) = \sigma(MLP(AvgPool(F)) + MLP(MaxPool(F)))),$$

where $M_c$ represents the channel attention, and MLP( ) is composed of fully connected layer 1+ReLU6+fully connected layer 2; $\sigma$ is the sigmoid operation, F is the input feature map, AvgPool( ) is the average pooling, MaxPool( ) is the maximum pooling, $M_s$ represents the spatial attention mechanism, $\sigma$ is the sigmoid operation; and The average pooling and the maximum pooling methods are used to compress the input feature map in a spatial attention module, to obtain a feature extraction map containing more crack information:

$$M_s(F) = \sigma\left(f^{7*7}[AvgPool(F), MaxPool(F)]\right),$$

where $M_s$ represents the spatial attention mechanism, $\sigma$ is the sigmoid operation, $f^{7*7}[\cdot]$ represents performing a 7*7 convolution operation, F is the input feature map, AvgPool( ) is the average pooling, and MaxPool( ) is the maximum pooling.

The data passing through the dropout layer in each layer is sparsely processed to avoid network over-fitting:

$$r_j^{(l)} \sim \text{Bernoulli}\,(p)$$

$$\tilde{y}^{(l)} = r^{(l)} * y^{(l)},$$

where the Bernoulli(p) function is used to generate a probability $$r_j^{(l)}$$

vector, to enable a neuron to stop working with the probability p, and $y^{(l)}$ is an output feature map of the previous layer, and $\tilde{y}^{(l)}$ is a feature map output after passing through the dropout layer.

The following Adam algorithm is used to optimize the network internal parameters:

$$f(\theta) = \text{Loss}(y_{o,c}, p_{o,c})$$

$$g_t = \nabla_\theta f_t(\theta_{t-1})$$

$$m_t = \beta_1 \cdot m_{t-1} + (1 - \beta_1) \cdot g_t$$

$$v_t = \beta_2 \cdot v_{t-1} + (1 - \beta_2) \cdot g_t^2$$

$$\hat{m}_t = m_t/(1 - \beta_1^t)$$

$$\hat{v}_t = v_t/(1 - \beta_2^t)$$

$$\theta_t = \theta_{t-1} - \alpha \cdot \hat{m}_t/\left(\sqrt{\hat{v}_t} + \epsilon\right),$$

where $\text{Loss}(y_{o.\ c}, p_{o.\ c})$ is a loss function between a predicted value and a true value of the network; $\theta$ is a parameter to be updated in the model; $g_t$ is a gradient obtained by deriving $\theta$ from the loss function $f(\theta)$; $\beta_1$ is a first-moment attenuation coefficient; $\beta_2$ is a second-moment attenuation coefficient; $m_t$ is an expectation of the gradient $g_t$; $v_t$ is an expectation of $$g_t^2,$$

$\hat{m}_t$ is an offset correction of $m_t$; $\hat{v}_t$ is an offset correction of $v_t$; $\theta_{t-1}$ is a parameter before the network update; $\theta_t$ is a parameter after the network update; and $\alpha$ is a learning rate.

Figure 6:
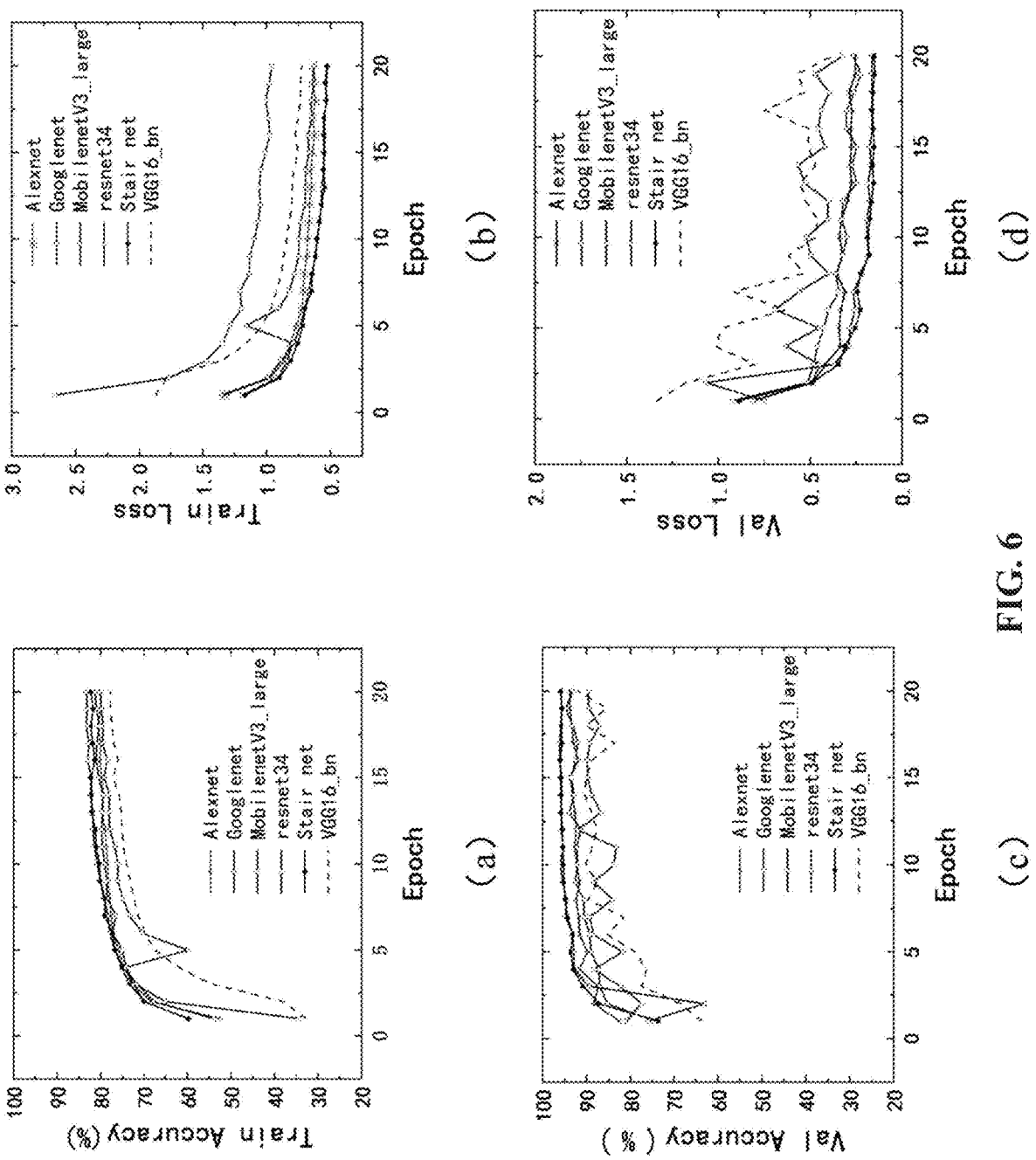
FIG. 6 (*a*) is the training accuracy of Stairnet and the other compared models during training according to an embodiment of the present disclosure.

Stairnet, along with commonly used neural network models, namely AlexNet, GoogLeNet, vgg16_bn, resnet34, and Mobilenet_v3_large area trained and validated in this embodiment. The training process is illustrated in FIG. 1. FIG. 6 presents the training accuracy, training loss, validation (val) accuracy, and val loss during the training process. A higher accuracy with lower loss on the validation set indicates stronger classification capability of the network. The calculation formula for accuracy is as follows:

$$\text{accuracy} = \frac{\sum_N eq(y_{o,c}, \max(p_{o,c}))}{N},$$

where $y_{o.\ c}$ is the true value of a single image in a data set (training set/validation set); $p_{o.\ c}$ is a predicted value of the network, including 7 probabilities, corresponding to 7 crack categories; max ( ) is the category corresponding to the value with the highest probability extracted in $p_{o.\ c}$; eq is used to verify whether the true value (label) $y_{o.\ c}$ is equal to max $(p_{o.\ c})$;

$$\sum_N ()$$

is used to calculate the number of the true value (label) $y_{o.\ c}$ of all the images in the data set is equal to max $(p_{o.\ c})$; and N is the number of all the crack images in the data set.

The loss is calculated as follows:

$$\text{Loss}(y_{o,c}, p_{o,c}) = -\sum_{c=1}^{M} y_{o,c} \log(p_{o,c})$$

$$\text{loss} = \frac{\sum_{steps} \text{Loss}(y_{o,c}, p_{o,c})}{N_{steps}}$$

$$N_{steps} = \frac{N}{N_{batch}},$$

where Loss $(y_{o.\ c}, p_{o.\ c})$ is the error between the predicted value and the true value of the network calculated using cross entropy for a single image; M is the number of classes, taking 7 in this embodiment; $N_{steps}$ is the number the strides of network training; N is the number of all crack images in the data set; $N_{batch}$ is the number of images included in a batch size, taking 16 in this embodiment.

FIG. 6 demonstrates that Stairnet achieves the fastest convergence speed, and exhibits slightly stronger performance in terms of accuracy and loss compared to MobilenetV3_large, outperforming other CNN models. Table 3 presents the evaluation metrics for all the networks in this embodiment. As shown in Table 3, Stairnet significantly outperforms other comparative CNNs in terms of model size and training time. Stairnet's model size is 1.48 MB, which is 90.86% smaller than MobilenetV3_large, resulting in a 30% reduction in training time. Additionally, Table 3 highlights Stairnet's clear efficiency advantage over models like VGG_bn and GoogLeNet.

In addition, precision and recalls for crack types are calculated and summarized using the test sets as shown in Table 4. Compared to the general CNN, Stairnet has higher accuracy and recalls for most crack types, for example, 0.90 and 0.94 for mesh crack and 0.70 and 0.88 for VGG16_bn.

The precision is the proportion of all positive samples that are judged to be true, the higher the precision, the lower the probability of network false positives. Precision is calculated as follows:

$$\text{Precision} = \frac{TP}{TP + FP}.$$

Recall, true positive (TP) rate, is the proportion of all positive samples predicted true to all actual positive samples. The higher the recall, the lower the probability of network false negative. Recall is calculated as follows:

$$Recall = \frac{TP}{TP + FN}.$$

Specificity, true negative (TN) rate, is the proportion of all negative samples predicted true to all actual negative samples, which is calculated as follows:

$$Specificity = \frac{TN}{TN + FP},$$

where TP, TN, false positive (FP), and false negative (FN) are shown in Table 5, the second letter includes P (Positive) and N (Negative) to indicate the predicted case, and the first letter includes T (True) and F (False) to measure the actual case. The explanation is as follows:

TP: The network judges that the sample is positive, and the judgment is true (in fact, the sample is positive).

TN: The network judges that the sample is negative, and the judgment is true (in fact, the sample is negative).

FP: The network judges that the sample is positive, and the judgment is false (in fact, the sample is negative).

FN: The network judges that the sample is negative, and the judgment is false (in fact, the sample is positive).

In conclusion, the Stairnet model proposed in this embodiment exhibits superior classification accuracy for concrete cracks compared to other comparative CNN models, all while maintaining a significantly smaller size.

TABLE 3

Accuracy, loss, model size, and training time of Stairnet and other CNNs

| | Accuracy | | Loss | | Model size | Training time |
|---|---|---|---|---|---|---|
| | Train | Val | | | | |
| CNN | (%) | (%) | Train | Val | (MB) | (s) |
| Stair net | 82.2 | 95.9 | 0.52 | 0.15 | 1.48 | 1015.82 |
| Alexnet | 80 | 93.7 | 0.63 | 0.25 | 55.6 | 1526.51 |
| VGG16_bn | 76.9 | 86.4 | 0.75 | 0.61 | 527 | 14534.98 |
| Googlenet | 81.3 | 93 | 0.95 | 0.27 | 39.4 | 1689.68 |
| Resnet34 | 80.9 | 89.2 | 0.61 | 0.32 | 81.3 | 4521.46 |
| Mobilenetv3_large | 83.2 | 95.8 | 0.52 | 0.16 | 16.2 | 1458.53 |

TABLE 4

Precision and recall of Stairnet and other CNNs

| Stair net | Precision | Recall | VGG16_bn | Precision | Recall |
|---|---|---|---|---|---|
| Background | 1 | 1 | Background | 1 | 0.25 |
| Hole | 0.95 | 0.88 | Hole | 0.39 | 0.91 |
| IrregularCrack | 0.95 | 0.59 | IrregularCrack | 0.91 | 0.38 |
| MeshCrack | 0.90 | 0.94 | MeshCrack | 0.70 | 0.88 |
| ObliqueCrack | 0.81 | 1 | ObliqueCrack | 0.76 | 0.87 |
| TransverseCrack | 0.84 | 0.97 | TransverseCrack | 0.89 | 0.83 |
| VerticalCrack | 0.90 | 0.92 | VerticalCrack | 0.85 | 0.56 |
| Mobilenetv3_large | Pre | Rec | googleNet | Pre | Rec |
| Background | 1 | 1 | Background | 1 | 0.92 |
| Hole | 0.95 | 0.9 | Hole | 0.42 | 0.82 |
| IrregularCrack | 0.91 | 0.65 | IrregularCrack | 0.89 | 0.49 |
| MeshCrack | 0.91 | 0.92 | MeshCrack | 0.91 | 0.88 |
| ObliqueCrack | 0.82 | 0.98 | ObliqueCrack | 0.72 | 0.87 |
| TransverseCrack | 0.88 | 0.97 | TransverseCrack | 0.82 | 0.60 |
| VerticalCrack | 0.88 | 0.92 | VerticalCrack | 0.87 | 0.58 |
| resNet34 | Pre | Rec | AlexNet | Pre | Rec |
| Background | 0.99 | 1 | Background | 1 | 0.95 |
| Hole | 0.92 | 0.81 | Hole | 0.72 | 0.78 |
| IrregularCrack | 0.96 | 0.43 | IrregularCrack | 0.88 | 0.46 |
| MeshCrack | 0.88 | 0.92 | MeshCrack | 0.80 | 0.95 |
| ObliqueCrack | 0.74 | 0.98 | ObliqueCrack | 0.77 | 0.99 |
| TransverseCrack | 0.78 | 0.97 | TransverseCrack | 0.87 | 0.89 |
| VerticalCrack | 0.87 | 0.90 | VerticalCrack | 0.85 | 0.84 |

TABLE 5

| Meaning of TP, TN, FP, and FN | | | |
| --- | --- | --- | --- |
| | | Predicted results | |
| Evaluation indicators | | Positive samples | Negative samples |
| Actual situations | Positive samples | TP | FN |
| | Negative samples | FP | TN |

The above is only an embodiment of the present disclosure and is not intended to limit the present disclosure. Any modifications, equivalent substitutions, and the like made within the spirit and principles of the present disclosure shall be included in the scope of protection of the present disclosure.

What is claimed is:

1. A three-stage modular convolutional neural network (CNN) for rapid classification of concrete cracks in images, comprising:

an input layer configured to receive an input image;

a shallow-layer feature extraction module, designated as Stair1, operatively connected to the input layer, wherein Stair1 comprises two basic block_1 structural blocks, each basic block_1 comprising an inverted residual block with convolutions (Convs) and having an expansion factor configurable as an integer during model initialization, wherein:

when the expansion factor is not 1, the basic block_1 consists of a first 3×3 Conv layer and a second 1×1 Conv layer; and when the expansion factor is 1, the basic block_1 consists of a single 3×3 Conv layer;

a first convolutional block attention module (CBAM) operatively connected to the shallow-layer feature extraction module (Stair1);

a mid-layer feature extraction module, designated as Stair2, operatively connected to the first CBAM, wherein Stair2 comprises a plurality of basic block_2 structural blocks each having a stride configurable to 1 or 2 during model initialization, wherein:

when configured for a stride of 1, the basic block_2 comprises a dual-branch structure having:

(i) a partitioner unit configured to partition an input feature map of basic block_2 (stride=1) into a first portion and a second portion;

(ii) a first processing branch (stride=1), coupled to the partitioner unit, configured to process the first portion, the first processing branch comprising a first 1×1 Conv layer, a 3×3 depthwise separable convolutional (DConv) layer, and a second 1×1 Conv layer connected in series;

(iii) a second processing branch (stride=1), coupled to the partitioner unit, configured to pass through the second portion without processing;

(iv) a concatenator unit (stride=1), coupled to outputs of the first and second processing branches (stride=1), configured to concatenate an output of the first processing branch and an output of the second processing branch; and (v) a first channel shuffle unit, coupled to an output of the concatenator unit (stride=1), configured to apply a channel shuffle operation to the concatenated output;

when configured for a stride of 2, the basic block_2 comprises a triple-branch structure having:

(i) a replicator unit configured to replicate an input feature map of basic block_2 (stride=2) into a first copy, a second copy, and a third copy;

(ii) a first processing branch (stride=2), coupled to the replicator unit, configured to process the first copy, the first processing branch comprising a first 1×1 Conv layer, a 5×5 DConv layer, and a second 1×1 Conv layer connected in series;

(iii) a second processing branch (stride=2), coupled to the replicator unit, configured to process the second copy, the second processing branch comprising a 5×5 DConv layer and a 1×1 Conv layer connected in series;

(iv) a third processing branch (stride=2), coupled to the replicator unit, configured to process the third copy, the third processing branch comprising a 3×3 max pooling layer and a 1×1 Conv layer connected in series;

(v) a concatenator unit, coupled to outputs of the first, second, and third processing branches (stride=2), configured to concatenate the outputs of the first, second, and third processing paths (stride=2); and (vi) a second channel shuffle unit, coupled to an output of the concatenator unit (stride=2), configured to apply a channel shuffle operation to the concatenated output;

a second CBAM operatively connected to the mid-layer feature extraction module (Stair2);

a deep-layer feature extraction module, designated as Stair3, operatively connected to the second CBAM, wherein Stair3 comprises an inverted residual structure with an efficient channel attention (ECA) module, the inverted residual structure in Stair 3 sequentially comprising: a first 1×1 Conv layer, a 5×5 DConv layer, the ECA module, and a second 1×1 Conv layer; and a fully connected layer operatively connected to the deep-layer feature extraction module (Stair3), configured to output a crack classification result.

2. The system of claim 1, wherein the shallow-layer feature extraction module (Stair1) exclusively comprises Conv layers without DConv layers;

the mid-layer feature extraction module (Stair2) comprises a plurality of structural blocks, and constitutes a majority of the structural blocks within the three-stage modular CNN; and the deep-layer feature extraction module (Stair3) employs inverted residual structures with a high expansion factor, while the shallow-layer and mid-layer feature extraction modules (Stair1, Stair2) employ inverted residual structures with a low expansion factor.

3. The system of claim 1, wherein the input layer comprises, in sequence, a convolution layer, a batch normalization (BN) layer, and an activation function layer, wherein the activation function layer applies a Hardswish function.

4. The system of claim 1, wherein the efficient channel attention (ECA) module is configured to perform cross-channel interaction on an input feature map of ECA module to generate an enhanced feature map by first applying a global average pooling operation to obtain a channel vector and then applying a one-dimensional convolution with an adaptively determined kernel size k to said channel vector.

5. The system of claim 1, wherein each of the first and second convolutional block attention modules (CBAMs) comprises:

a channel attention sub-module configured to generate a channel attention map by: performing both a global average pooling operation and a global max pooling operation on an input feature map of CBAM to obtain a first intermediate result and a second intermediate result, respectively; processing the first and second intermediate results concurrently through a shared multilayer perceptron (MLP); and summing outputs of the MLP; and a spatial attention sub-module configured to generate a spatial attention map by: performing an average pooling operation and a max pooling operation across channels of an output of the channel attention sub-module to obtain a third intermediate result and a fourth intermediate result; concatenating the third and fourth intermediate results; and applying a convolution operation to a result of the concatenating.

6. The system of claim 1, further comprising a dropout layer disposed within the fully connected layer, configured to randomly deactivate neurons during a training phase with a deactivation probability p.

7. The system of claim 1, wherein parameters of the CNN are optimized during a training phase using an Adam optimization algorithm.

8. A computer-implemented method for classifying concrete cracks in digital images, the method comprising:

providing the three-stage modularized CNN according to any one of claims 1-7;

receiving, at the input layer of said CNN system, digital images;

processing the received digital images through the sequentially connected stages of said CNN, including performing feature extraction by the shallow-, mid-, and deep layer feature extraction modules (Stair1, Stair2, Stair3), and performing feature refinement by the first and second CBAMs; and generating, at the fully connected layer of said CNN, a classification output indicative of a presence or type of concrete crack in the received digital images.

* * * * *